(12) United States Patent
Ichimiya

(10) Patent No.: US 10,091,410 B2
(45) Date of Patent: Oct. 2, 2018

(54) FOCUS DETECTION APPARATUS AND METHOD, AND IMAGE CAPTURING APPARATUS

(71) Applicant: CANON KABUSHIKI KAISHA, Tokyo (JP)

(72) Inventor: Takashi Ichimiya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/617,086

(22) Filed: Jun. 8, 2017

(65) Prior Publication Data

US 2017/0366735 A1 Dec. 21, 2017

(30) Foreign Application Priority Data

Jun. 16, 2016 (JP) .................................. 2016-120205

(51) Int. Cl.
*H04N 5/232* (2006.01)
*G06T 7/70* (2017.01)
(Continued)

(52) U.S. Cl.
CPC ......... *H04N 5/23212* (2013.01); *G03B 13/36* (2013.01); *G06T 7/70* (2017.01);
(Continued)

(58) Field of Classification Search
CPC ............. H04N 5/23212; H04N 5/3696; H04N 5/2357; H04N 5/2351; H04N 5/23245;
(Continued)

(56) References Cited

U.S. PATENT DOCUMENTS 4,634,851 A * 1/1987 Ogasawara .............. G02B 7/34
250/201.7
4,969,006 A * 11/1990 Ishibashi .................. G02B 7/34
396/104
(Continued)

FOREIGN PATENT DOCUMENTS

JP 2011-150139 A 8/2011
JP 2015-100090 A 5/2015

*Primary Examiner* — Jason A Flohre
(74) *Attorney, Agent, or Firm* — Cowan, Liebowitz & Latman, P.C.

(57) ABSTRACT

A focus detection apparatus comprises: a determination unit that determines whether a flicker light source is included in focus detection areas; a plurality of sensors for focus detection that correspond to the focus detection areas, and accumulate electric charges corresponding to received light; and a controller that controls accumulation in the sensors. The controller monitors a signal that is based on electric charges accumulated in the sensors, and performs first control for stopping accumulation in a sensor in which the signal has exceeded a predetermined threshold value, and second control for stopping accumulation in a sensor which continues accumulation of electric charges when a maximum accumulation period has reached. The controller sets the maximum accumulation period based on a determination result by the determination unit and the accumulation period of a first sensor in which the first control is performed first.

21 Claims, 8 Drawing Sheets

(51) Int. Cl.
*G03B 13/36* (2006.01)
*H04N 5/225* (2006.01)
*H04N 5/235* (2006.01)
*H04N 5/369* (2011.01)

(52) U.S. Cl.
CPC ......... *H04N 5/2256* (2013.01); *H04N 5/2351* (2013.01); *H04N 5/2357* (2013.01); *H04N 5/23245* (2013.01); *H04N 5/23293* (2013.01); *H04N 5/3696* (2013.01)

(58) Field of Classification Search
CPC .. H04N 5/2256; H04N 5/23293; G03B 13/36; G06T 7/70; G02B 7/28–7/40; G02B 7/09; G02B 7/102
See application file for complete search history.

(56) References Cited

U.S. PATENT DOCUMENTS

| | | | | |
|---|---|---|---|---|
| 5,267,015 | A * | 11/1993 | Kai | G02B 7/34 356/218 |
| 5,485,002 | A * | 1/1996 | Kusaka | G02B 7/346 250/201.8 |
| 2006/0055813 | A1* | 3/2006 | Nakata | G02B 7/28 348/345 |
| 2015/0163395 | A1* | 6/2015 | Konishi | H04N 5/2353 348/230.1 |
| 2015/0256792 | A1* | 9/2015 | Aoki | G02B 7/36 348/226.1 |

* cited by examiner

FOCUS DETECTION APPARATUS AND METHOD, AND IMAGE CAPTURING APPARATUS

BACKGROUND OF THE INVENTION

Field of the Invention

The present invention relates to a focus detection apparatus and method, and an image capturing apparatus.

Description of the Related Art

Conventionally, as a focus detection apparatus of a camera, so-called focus detection apparatuses employing a phase difference detection method are known. In the phase difference detection method, first, light flux from an object that has passed through different exit pupil regions of an imaging optical system is formed into images on a pair of line sensors. The displacement amount of the relative positions of a pair of object images obtained by photoelectrically converting the formed object images is then obtained (hereinafter, referred to as "phase difference calculation"), and thereby a defocus amount of the object is detected, and the focus lens is driven based on this defocus amount.

Furthermore, multipoint focus detection apparatuses for performing focus adjustment from defocus distribution information of an imaging screen using a plurality of line sensors are also known. Japanese Patent Laid-Open No. 2011-150139 discloses a technique for monitoring accumulated signals of each of the plurality of line sensors and determining timing to stop the accumulation.

On the other hand, detection apparatuses for detecting whether or not the light source that is illuminating the object is a light source such as a fluorescent light that is causing flicker by being driven using a commercial power source (hereinafter, referred to as a "flicker light source") are known. Japanese Patent Laid-Open No. 2015-100090 discloses a technique for detecting the presence or absence of flicker of ambient light based on change in output of a photometry sensor.

However, in the conventional technique disclosed in the above Japanese Patent Laid-Open No. 2011-150139, when shooting under a flicker light source, there are cases where a favorable focus detection result cannot be obtained depending on the location of the object and the shooting timing.

Here, an example of a case where a favorable focus detection result cannot be obtained at the time of shooting under a flicker light source will be described with reference to FIGS. 7 and 8.

FIG. 7 shows a finder image, in which AF frames 701 to 709 corresponding to a plurality of focus detection areas are positioned. The AF frames 702 and 704 in the screen include fluorescent lights that are a flicker light source, and line sensors corresponding to the AF frames 702 and 704 directly receive light from this flicker light source. Objects in other AF frames are illuminated by the fluorescent lights and sunlight that enters the windows on the side.

FIG. 8 shows variation in a quantity of light of the flicker light source over time. Here, if accumulation in the line sensors is started in the vicinity of a point 801, namely, the peak of the quantity of light of the flicker light source, large signals are obtained in a short period in the line sensors corresponding to the AF frames 702 and 704, and accumulation stops earlier than in the other line sensors. The accumulation period at this time is denoted by ST1. The maximum accumulation period of the line sensors that correspond to other AF frames and in which accumulation is ongoing is set based on the accumulation period ST1 of the line sensors in which accumulation stopped earlier. Specifically, if the accumulation period of the line sensors in which accumulation stopped earlier is short, the maximum accumulation period for the other line sensors is set short. By performing control in this manner, in the case of an object whose luminance difference is large, it is possible to suppress an increase in accumulation period in a dark area, and thus the period required for overall focus detection can be shortened. If accumulation in a line sensor is started at the point 801, the accumulation period ST1 is short, and thus the maximum accumulation period of the other line sensors is set short. As a result, the signal amount obtained with the other line sensors is small, and thus there are cases where focus detection cannot be performed based on the signal from a line sensor in which the contrast of the object is relatively small.

On the other hand, if accumulation in a line sensor is started at a point 802 in FIG. 8, namely, in the vicinity of the bottom of the quantity of light of the flicker light source, an accumulation period ST2 for the line sensors corresponding to the AF frames 702 and 704 becomes longer than ST1. As a result, the maximum accumulation period is also set long, and thus focus detection results are easily obtained in more line sensors, but a period required for obtaining the focus detection results is longer.

In addition, as described above, in shooting under a flicker light source, the number of obtained focus detection results changes depending on the timing for starting accumulation, and thus defocus distribution information becomes unstable. Moreover, if sufficient defocus distribution information is not obtained, there has been a problem in that, in the case where photometry is controlled after determining the position and size of an object from the defocus distribution information, the accuracy thereof deteriorates.

SUMMARY OF THE INVENTION

The present invention has been made in consideration of the above situation, and is able to appropriately perform accumulation control of a line sensor for focus detection even under a flicker light source.

According to the present invention, provided is a focus detection apparatus comprising: a determination unit configured to determine whether or not a flicker light source is included in a plurality of predetermined focus detection areas; a plurality of sensors for focus detection that correspond to the focus detection areas, and in which electric charges corresponding to received light accumulate; and a controller configured to control accumulation in the sensors, wherein the controller monitors a signal that is based on electric charges accumulated in each of the sensors, performs first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period, and sets the maximum accumulation period of a sensor that is different from a first sensor in which accumulation has been stopped first by the first control, based on a result of determination performed by the determination unit and the accumulation period of the first sensor.

Further, according to the present invention, provided is a focus detection apparatus comprising: a plurality of sensors for focus detection that correspond to a plurality of predetermined focus detection areas, and in which electric charges corresponding to received light accumulate; and a controller configured to control accumulation in the sensors, wherein the controller monitors a signal that is based on electric charges accumulated in each of the sensors, performs first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period, and sets the maximum accumulation period of a sensor that is different from a first sensor in which accumulation has been stopped first by the first control, based on an accumulation period of the first sensor, and the maximum accumulation period of the sensor that is different from the first sensor is changed according to whether or not a predetermined condition, including a condition that a flicker light source is included in the focus detection areas, is satisfied.

Furthermore, according to the present invention, provided is an image capturing apparatus comprising: an image capturing unit; and a focus detection apparatus comprising: a determination unit configured to determine whether or not a flicker light source is included in a plurality of predetermined focus detection areas; a plurality of sensors for focus detection that correspond to the focus detection areas, and in which electric charges corresponding to received light accumulate; and a controller configured to control accumulation in the sensors, wherein the controller monitors a signal that is based on electric charges accumulated in each of the sensors, performs first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period, and sets the maximum accumulation period of a sensor that is different from a first sensor in which accumulation has been stopped first by the first control, based on a result of determination performed by the determination unit and the accumulation period of the first sensor.

Further, according to the present invention, provided is an image capturing apparatus comprising: an image capturing unit; and a focus detection apparatus comprising: a plurality of sensors for focus detection that correspond to a plurality of predetermined focus detection areas, and in which electric charges corresponding to received light accumulate; and a controller configured to control accumulation in the sensors, wherein the controller monitors a signal that is based on electric charges accumulated in each of the sensors, performs first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period, and sets the maximum accumulation period of a sensor that is different from a first sensor in which accumulation has been stopped first by the first control, based on an accumulation period of the first sensor, and the maximum accumulation period of the sensor that is different from the first sensor is changed according to whether or not a predetermined condition, including a condition that a flicker light source is included in the focus detection areas, is satisfied.

Further, according to the present invention, provided is a control method of a focus detection apparatus having a plurality of sensors for focus detection that correspond to a plurality of predetermined focus detection areas, and in which electric charges corresponding to received light accumulate and a controller configured to control accumulation in the sensors, the control method comprising: determining whether or not a flicker light source is included in the focus detection areas; monitoring a signal that is based on electric charges accumulated in each of the sensors, and performing first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period; and setting the maximum accumulation period of a sensor that is different from a first sensor in which accumulation has been stopped first by the first control, based on a result of determination in the determining and the accumulation period of the first sensor.

Further, according to the present invention, provided is a control method of a focus detection apparatus having a plurality of sensors for focus detection that correspond to a plurality of predetermined focus detection areas, and in which electric charges corresponding to received light accumulate and a controller configured to control accumulation in the sensors, the control method comprising: monitoring a signal that is based on electric charges accumulated in each of the sensors, and performing first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period; and setting the maximum accumulation period of a sensor that is different from a first sensor in which accumulation has been stopped first by the first control, based on an accumulation period of the first sensor, wherein, in the setting of the maximum accumulation period, the maximum accumulation period of the sensor that is different from the first sensor is changed according to whether or not a predetermined condition including a condition that a flicker light source is included in the focus detection areas is satisfied.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Figure 1:
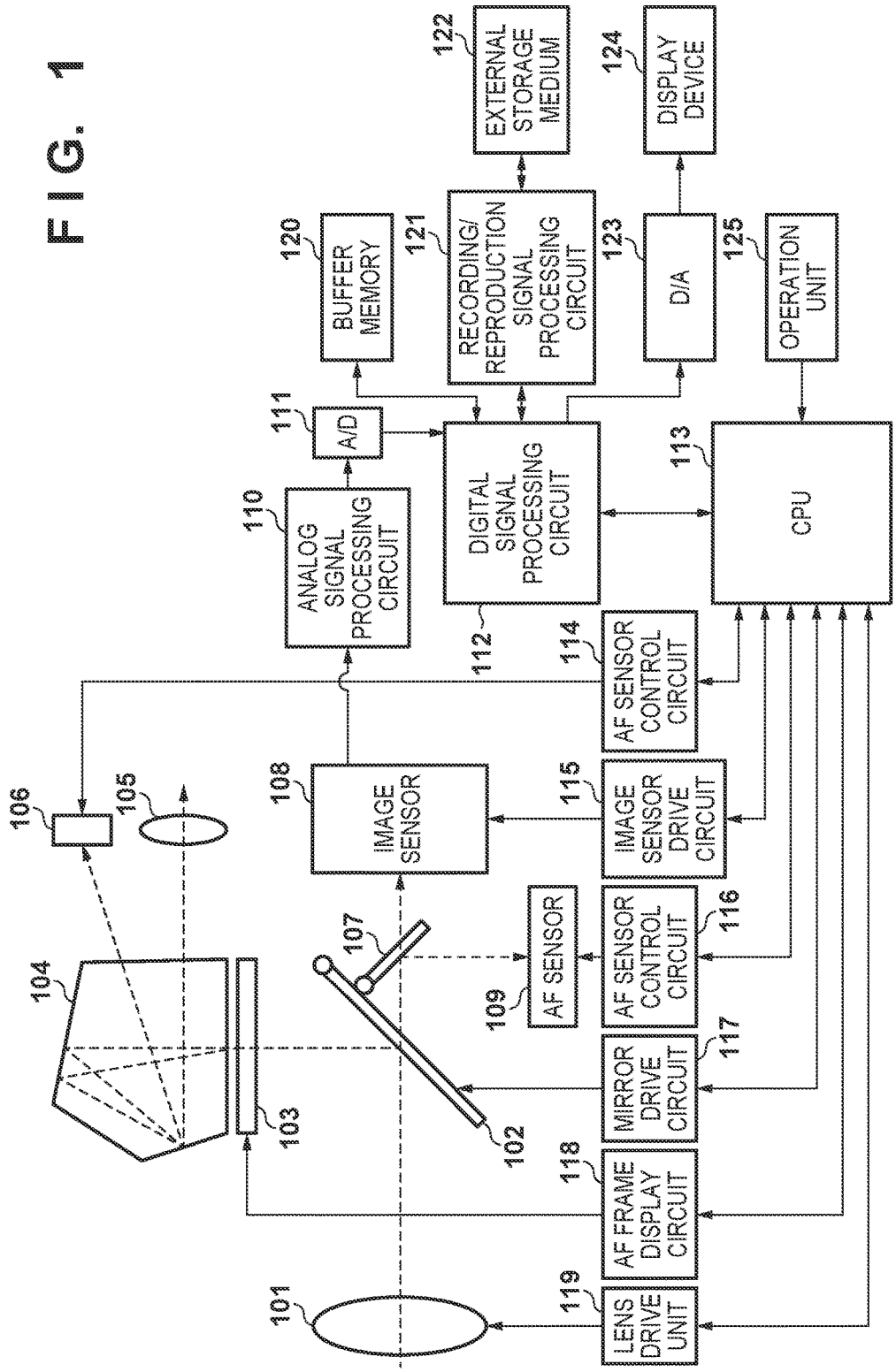
FIG. 1 is a block diagram showing a schematic configuration of a camera according to an embodiment of the present invention.

FIG. 1 is a block diagram showing a schematic configuration of a camera that is an image capturing apparatus according to an embodiment of the present invention. In FIG. 1, a photographing lens 101 constituting an imaging optical system is driven by a lens drive unit 119, and the lens drive unit 119 is provided with a communication circuit that communicates with a CPU 113, a lens drive mechanism for driving the photographing lens 101 so as to perform focus adjustment and the like, and a drive circuit thereof. Note that in FIG. 1, the photographing lens 101 is represented by one lens, but in actuality, the photographing lens 101 is constituted by a plurality of lenses including a focus lens.

A main mirror 102 has a semi-transmissive portion, and withdraws out of the imaging light path (mirror-up) at the time of shooting by being driven by a mirror drive circuit 117 and is obliquely placed in the imaging light path (mirror-down) at the time of focus detection. FIG. 1 shows a mirror-down state in which the main mirror 102 is inserted in the imaging light path. In the mirror-down state, the main mirror 102 guides a portion of light flux of an object optical image that has passed through the photographing lens 101 to a finder optical system constituted by an AF frame display unit 103, a pentagonal prism 104 and an eyepiece lens 105. Furthermore, the pentagonal prism 104 guides the portion of the light flux of the object optical image to an AE sensor 106 positioned above the eyepiece lens 105.

The AF frame display unit 103 is constituted by a transmissive liquid crystal, and displays an AF frame indicating a focus detection area, and thereby the photographer can check the AF frame on the imaging screen through the finder. An AF frame display circuit 118 controls the AF frame display unit 103 so as to display an AF frame.

The AE sensor 106 is constituted to include a multipixel area sensor for obtaining the luminance value of the imaging screen in order to perform exposure control of an image sensor 108, and capturing an object image for object recognition. A pixel portion is provided with R (red), G (green) and B (blue) primary color filters, and thereby RGB signals of an object image can be output. An AE sensor control circuit 114 drives the AE sensor 106, calculates the luminance value of the object based on the RGB signals of the object image that are output from the AE sensor 106, and detects the area of the face of the object based on obtained luminance distribution information and color information.

A sub mirror 107 can be folded and unfolded relative to the main mirror 102 in synchronization with an operation of the main mirror 102. The main mirror 102 and the sub mirror 107 are driven by the mirror drive circuit 117. When the main mirror 102 is in the mirror-down state, a portion of light flux that has passed through the semi-transmissive portion of the main mirror 102 is reflected downward by the sub mirror 107, and enters an AF sensor 109. The AF sensor 109 is provided with a plurality of line sensors in order to perform focus detection, and can detect the focus state of the photographing lens 101 in a plurality of areas of the imaging screen by a phase difference detection method, under control of an AF sensor control circuit 116.

When the main mirror 102 is brought into the mirror-up state by being driven by the mirror drive circuit 117, an object optical image is formed, after passing through the photographing lens 101, on the image sensor 108 constituted using an image sensing element such as a CCD or CMOS sensor. The image sensor 108 converts the formed object optical image into electric charges corresponding to the quantity of light thereof by being driven by an image sensor drive circuit 115, and outputs obtained image signals.

The image signals that have been output from the image sensor 108 are input to an analog signal processing circuit 110, and thereafter, converted from analog signals into digital signals by an A/D converter 111. A digital signal processing circuit 112 then performs known image processing such as shading correction and gamma correction on the obtained digital image signals.

A buffer memory 120 is connected to the digital signal processing circuit 112, and can store image data for a plurality of frames captured with the image sensor 108. The digital image signals that underwent A/D conversion are temporarily stored in this buffer memory 120. The digital signal processing circuit 112 reads the image data stored in the buffer memory 120 and performs the above-described processing, and the data after being processed is stored in the buffer memory 120 again. The image data stored temporarily in the buffer memory 120 can be recorded in an external storage medium 122 such as a memory card by a recording/reproduction signal processing circuit 121.

The CPU 113 is a CPU that performs overall control of the camera, and is provided with a RAM or a ROM for storing various parameters, flags and the like, and a counter for measuring various operation periods, and the like. The CPU 113 is connected to constituent elements including the digital signal processing circuit 112, the AE sensor control circuit 114, the image sensor drive circuit 115, the AF sensor control circuit 116, the mirror drive circuit 117, the AF frame display circuit 118, the lens drive unit 119 and an operation unit 125, and controls operations of such constituent elements as appropriate.

The recording/reproduction signal processing circuit 121 includes an interface for performing data communication with the storage medium 122, and when recording image data in the storage medium 122, compresses the image data in accordance with a known format such as a JPEG format. On the other hand, when reading image data from the external storage medium 122, the recording/reproduction signal processing circuit 121 performs processing for decompressing the image data.

A display device 124 is used when displaying a captured image and reproducing and displaying image data recorded in the storage medium 122. When displaying an image on the display device 124, image data stored in the buffer memory 120 is read out, and a D/A converter 123 converts digital image data into analog video signals, and the image is displayed using the analog video signals after being converted.

Note that there are two forms for displaying an image captured with the image sensor 108 on the display device 124. One is a display form called live view in which images captured with the image sensor 108 are sequentially updated and displayed with the main mirror 102 in the mirror-up state. The other is a display form called a freeze image in which an image captured with the image sensor 108 is displayed for a predetermined period after a camera releasing operation.

The operation unit 125 includes operation members and the like for operating the camera such as a power switch for turning on/off the camera, a release button, and a setting button for selecting a shooting mode. When one of the switch and buttons is operated, a signal corresponding to the operation is input to the CPU 113. Note that a switch SW1 that is turned on by a first stroke operation (half-press operation) on the release button operated by the photographer and a switch SW2 that is turned on by a second stroke operation (full-press operation) on the release button are connected to the release button.

Figure 2A:
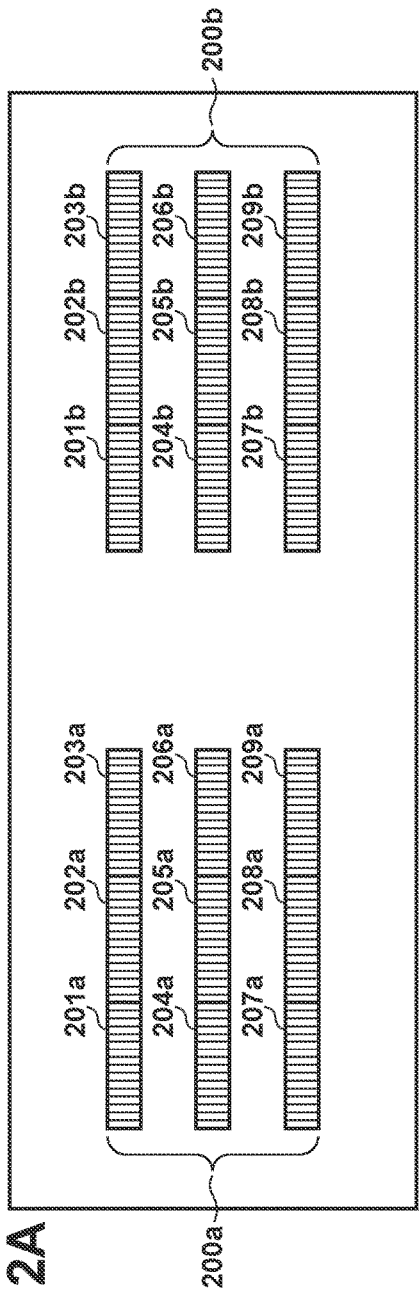
FIGS. 2A and 2B are diagrams showing positioning of focus detection areas and positional relationship between the focus detection areas and line sensors according to the embodiment.
Figure 2B:
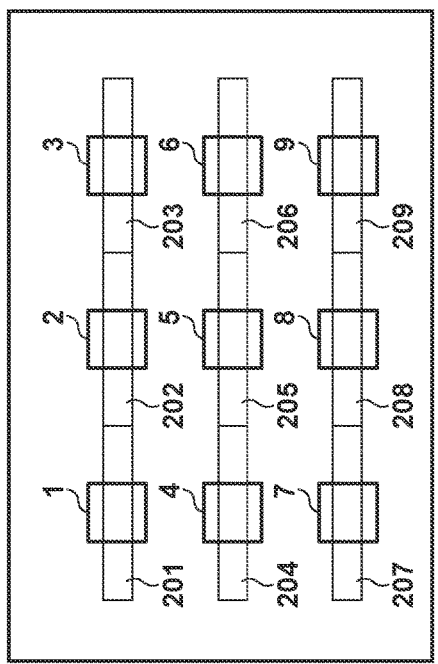

FIGS. 2A and 2B are conceptual diagrams showing the positions of line sensors, and the positional relationship between AF frames in the imaging screen and the line sensors in the AF sensor 109. The example shown in FIG. 2A show a case where nine line sensors 201a to 209a in which a plurality of photoelectric conversion elements are arranged linearly are positioned in a line sensor group 200a. Similarly, nine line sensors 201b to 209b are positioned in a line sensor group 200b. The line sensors 201a to 209a and the line sensors 201b to 209b that respectively correspond to each other form pairs of line sensors 201 to 209. The line sensor groups 200a and 200b respectively receive light flux from the object that has passed through different exit pupil regions of the photographing lens 101.

FIG. 2B is a diagram in which the pairs of line sensors 201 to 209 are projected onto the imaging screen. The pairs of line sensors 201 to 209 respectively correspond to AF frames 1 to 9. The focus states of the AF frames 1 to 9 can then be detected by detecting the phase difference of two images that are output from each of the nine pairs of line sensors 201 to 209.

Figure 3:
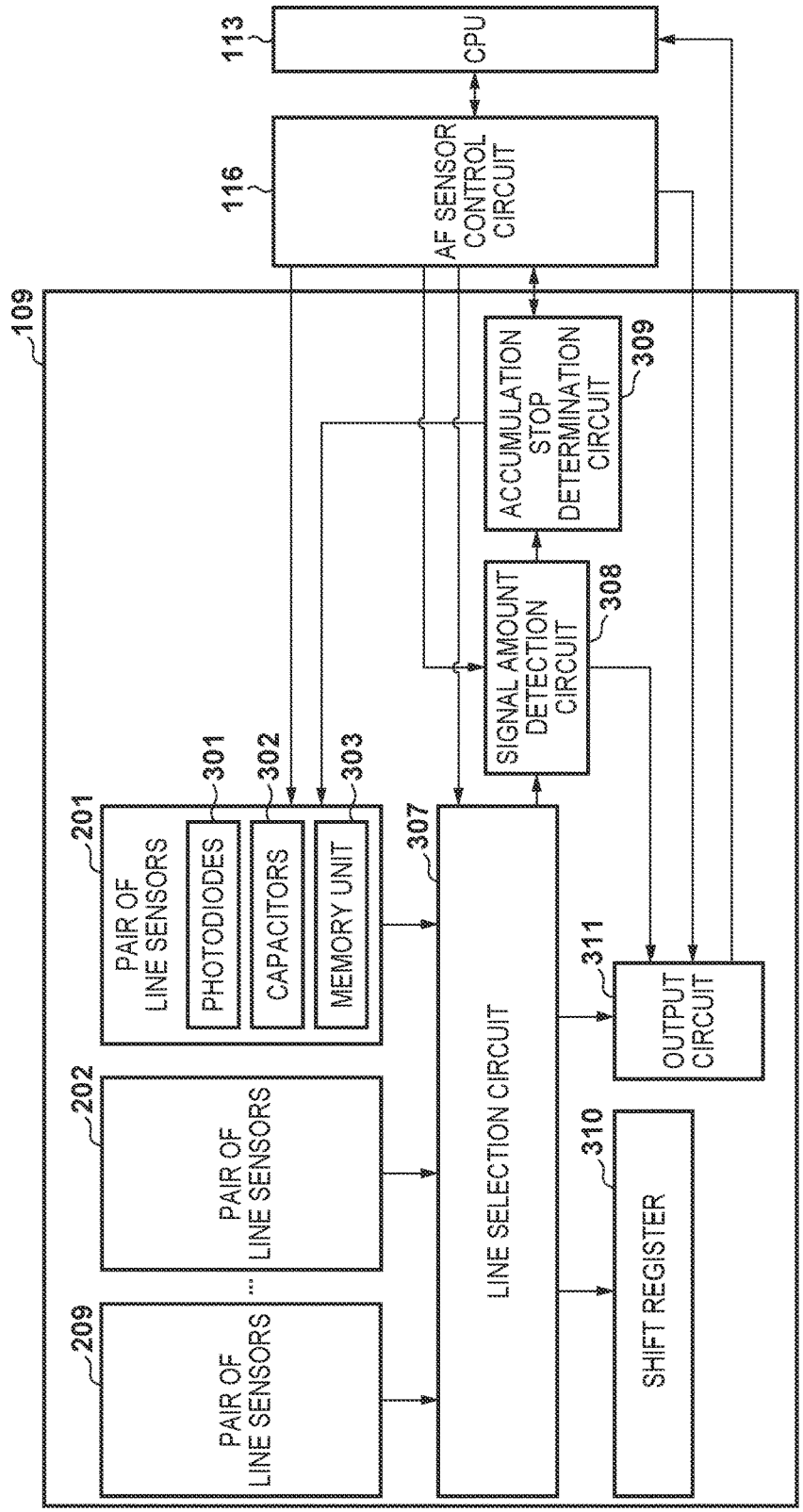
FIG. 3 is a block diagram showing configuration of an AF sensor according to the embodiment.

FIG. 3 is a block diagram showing the functional configuration of the AF sensor 109. An object image (optical image) is subjected to photoelectric conversion performed by the pairs of line sensors 201 to 209, and accumulated as electric charges. The line sensors 201a and 201b constituting the pair of line sensors 201 are each constituted by photodiodes 301 that are a photoelectric conversion portion, capacitors 302 in which signal electric charges are accumulated and that convert the signal electric charges into voltage values, and a memory unit that stores pixel signals that underwent voltage conversion by the capacitor at the time of accumulation being stopped. The pairs of line sensors 202 to 209 have a configuration similar to that of the pair of line sensors 201.

The AF sensor control circuit 116 receives an instruction from the CPU 113, and controls constituent elements in the AF sensor 109 so as to control accumulation and a readout operation of the pixel signals of the pairs of line sensors 201 to 209. Also, the AF sensor control circuit 116 transmits, to the CPU 113, information regarding a line sensor for which stopping accumulation has been determined.

A line selection circuit 307 selects one of the pairs of line sensors 201 to 209. The line selection circuit 307 then outputs the pixel signals of the selected pair of line sensors to a signal amount detection circuit 308 and an output circuit 311. The signal amount detection circuit 308 detects the feature amount (here, a contrast value as an example) of the pixel signals of the pair of line sensors selected by the line selection circuit 307. The signal amount detection circuit 308 then outputs the detected contrast value to an accumulation stop determination circuit 309, and to the CPU 113 via the output circuit 311.

The accumulation stop determination circuit 309 compares the contrast value with a predetermined accumulation-stop level, and performs an electric charge accumulation stop determination. Here, when the contrast value exceeds the accumulation-stop level, an accumulation stop determination signal is output to the AF sensor control circuit 116. In a case of receiving the accumulation stop determination signal, the AF sensor control circuit 116 then outputs a control signal to the pair of line sensors for which the accumulation stop determination has been performed, in order to stop the accumulation operation. The pair of line sensors ends accumulation by temporarily storing, in a memory unit 303, the pixel signals accumulated in the capacitors 302. Also, the AF sensor control circuit 116 outputs, to the CPU 113, an accumulation end signal and information regarding the pair of line sensors in which accumulation has ended.

On the other hand, if the contrast value has not reached the accumulation-stop level by a predetermined maximum accumulation period Tstp, the CPU 113 can also output an accumulation stop request signal to the AF sensor control circuit 116 in order to forcibly stop accumulation of electric charges. In the case of receiving the accumulation stop request signal from the CPU 113, the AF sensor control circuit 116 controls the line selection circuit 307 so as to select a pair of line sensors in which the accumulation operation has not been stopped. In the selected pair of line sensors, the pixel signals accumulated in the capacitors 302 are then temporarily stored in the memory unit 303. Accordingly, the pixel signals of all the pairs of line sensors 201 to 209 are stored in the memory unit 303. A control signal is then output to a shift register 310, and the shift register 310 is controlled so as to output the pixel signals of the pairs of line sensors 201 to 209 to the output circuit 311 one pixel at a time. The output circuit 311 performs various types of processing such as amplification processing on the pixel signals, and outputs the signals after being processed to an A/D converter (not illustrated) of the CPU 113.

Figure 4A:
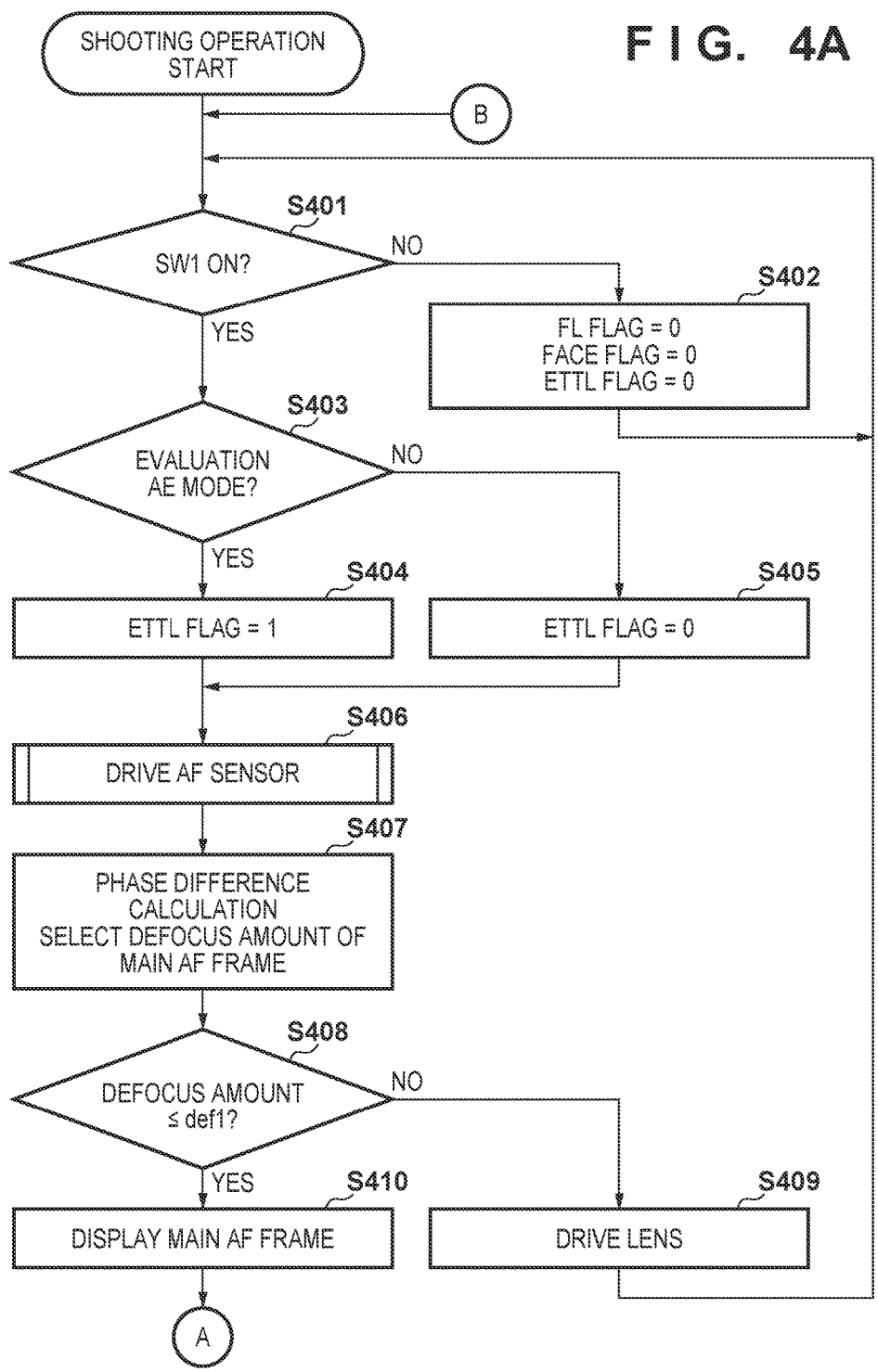
FIG. 4A is a flowchart showing a shooting operation according to the embodiment.

Next, a shooting operation and an AF operation of this embodiment in a camera having the above configuration will be described with reference to flowcharts of FIGS. 4A, 4B and 5.

In step S401, the CPU 113 determines whether or not the switch SW1 has been turned on by operating the release button included in the operation unit 125. If the switch SW1 has not been turned on, the procedure transitions to step S402, where processing for clearing various flags FL, FACE and ETTL, which will be described later, is repeated until the switch SW1 is turned on. On the other hand, if the switch SW1 is turned on, the procedure transitions to step S403.

In step S403, the CPU 113 determines a shooting mode that has been set by the operation unit 125. Here, it is assumed that there are two shooting modes, namely, an average AE mode for performing exposure control based on the average luminance of the entire screen and an evaluation AE mode for performing exposure control based on the average luminance of the main object range in the screen, and these modes can be selected with the operation unit 125.

If the evaluation AE mode is selected, an internal control flag ETTL of the CPU 113 is set to 1 in step S404. On the other hand, if the average AE mode is selected, the internal control flag ETTL is set to 0 in step S405. After that, in step S406, the CPU 113 instructs the AF sensor control circuit 116 to perform drive control of the AF sensor 109. Note that the processing in step S406 will be described later in detail with reference to FIG. 5.

Next, in step S407, the CPU 113 instructs the AF sensor control circuit 116 to sequentially output the pixel signals of the pairs of line sensors 201 to 209 in the AF sensor 109, and perform A/D conversion. Phase differences are then calculated from the pixel signals that underwent A/D conversion, and thereby defocus amounts respectively corresponding to the AF frames 1 to 9 in the screen are calculated, and defocus distribution information is generated. Note that there are cases where the reliability of phase difference calculation for a defocus amount is low and is not suitable for use in focus adjustment (AFNG). Furthermore, a defocus amount corresponding to a main AF frame is selected from the defocus amounts corresponding to the AF frames 1 to 9. Here, a defocus amount that is closest to the camera is selected, excluding defocus amounts determined as AFNG.

In step S408, the CPU 113 determines whether or not the defocus amount of the main AF frame calculated in step S407 is a focus determination value def1 or less. If the defocus amount is within the determination value def1, for example, ¼ Fδ (F is the aperture value of the lens, and δ is a constant of 20 μm, and thus ¼ Fδ is equal to 10 μm at the maximum aperture F2.0 of the lens) or less, it is determined that the object is in focus, and the procedure transitions to step S410. On the other hand, if the defocus amount is greater than the determination value def1, the procedure transitions to step S409.

In step S409, the defocus amount of the main AF frame calculated by the CPU 113 in step S407 is converted into the number of pulses that is a lens drive amount, and the photographing lens 101 is driven by the lens drive unit 119, and the procedure returns to step S401. The operations of steps S401 to S409 are repeated until it is determined that the defocus amount is the determination value def1 or less in step S408, and the object is in focus. In step S410, the CPU 113 controls the AF frame display unit 103 so as to display the main AF frame selected in step S407.

Figure 6:
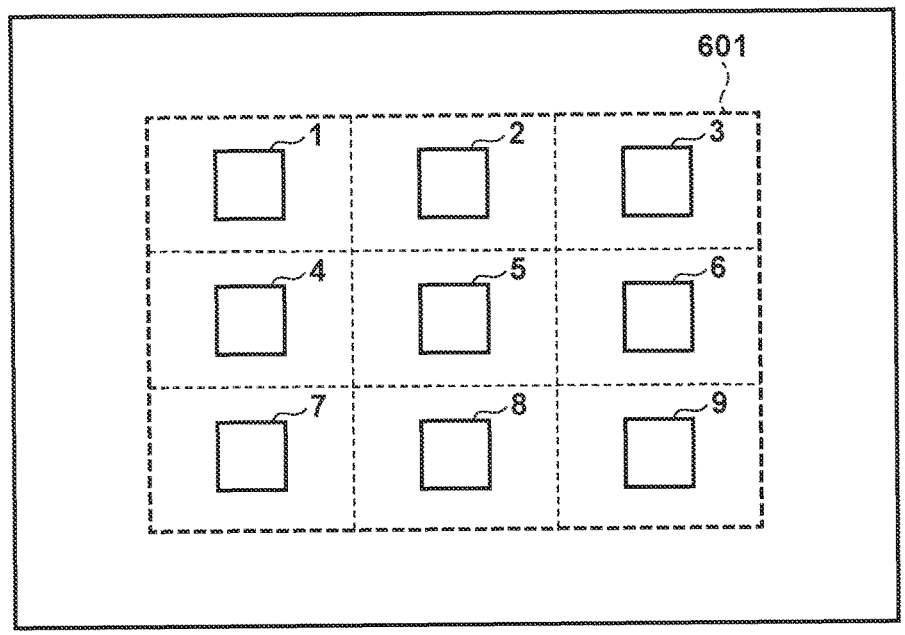
FIG. 6 is a diagram showing a luminance calculation area of the AE sensor according to the embodiment.
Figure 7:
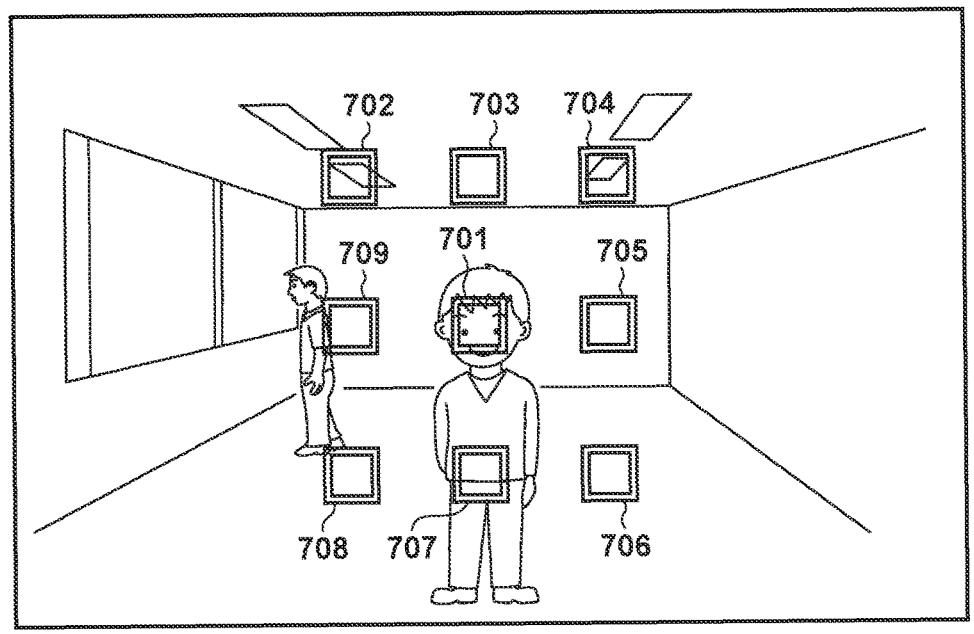
FIG. 7 is a diagram showing relationship between an imaging screen and focus detection areas.
Figure 8:
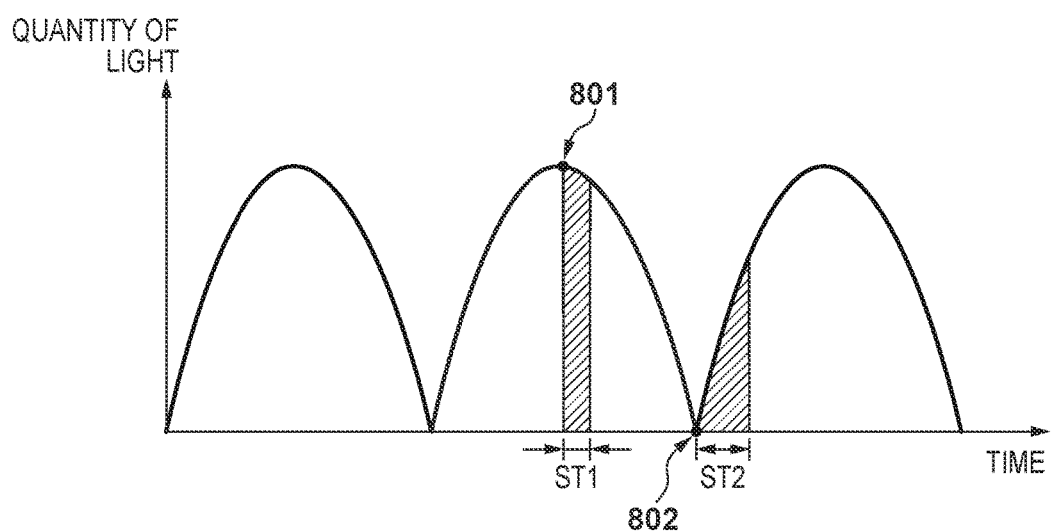
FIG. 8 is a diagram showing variation of a quantity of light of a flicker light source.

In step S411, the CPU 113 instructs the AE sensor control circuit 114 to perform drive control of the AE sensor 106. FIG. 6 shows an AE range (a photometry area) in the imaging screen. An area 601 surrounded by a broken line in FIG. 6 indicates an AE range, and the luminance values of the nine areas including the AF frames 1 to 9 are calculated. It is then determined whether or not the ambient light is light from a flicker light source based on the change (period) in luminance value over time. Furthermore, the position and size of the face is detected from the color and shape of the object.

If it is determined that the ambient light is light from a flicker light source in step S412, the CPU 113 sets an internal control flag FL to 1 in step S413. On the other hand, if it is determined that the ambient light is not light from a flicker light source, the internal control flag FL is set to 0 in step S414.

In step S415, the CPU 113 determines from the detection result in step S411 whether or not there is a face in the imaging screen. If there is a face, the CPU 113 sets an internal control flag FACE to 1 in step S416. On the other hand, if there is no face, the internal control flag FACE is set to 0 in step S417.

The processing in steps S418 to S422 is luminance calculation processing, and the calculation method changes according to the internal control flags ETTL and FACE.

First, in step S418, the CPU 113 determines the internal control flag ETTL indicating a shooting mode. If ETTL is 0, the shooting mode is the average AE mode, and the procedure transitions to step S419, where the average luminance of the entire screen is calculated by averaging the nine luminance values detected in step S411. On the other hand, if ETTL is 1, the shooting mode is the evaluation AE mode, and the procedure transitions to step S420.

In step S420, the CPU 113 determines the internal control flag FACE indicating a face detection result. If FACE is 1, the procedure transitions to step S421, and the object luminance is calculated by averaging the luminance values of areas included in the range of the face out of the nine AE areas shown in FIG. 6, based on the position and size of the face. On the other hand, if FACE is 0, the procedure transitions to step S422, where the range of the object is detected from defocus distribution information. Here, out of the AF frames other than the main AF frame selected in step S403, an AF frame whose difference in defocus amount from the main AF frame is small, for example, 7/4Fδ or less is determined to be in the same object range as the main AF frame. The object luminance is calculated by averaging the luminance values of the areas included in the object range out of the nine AE areas in FIG. 6.

In step S423, the CPU 113 determines whether or not the switch SW2 has been turned on by operating the release button included in the operation unit 125. If the switch SW2 has been turned on, the procedure transitions to a shooting operation of step S424. On the other hand, if SW2 has not been turned on, the procedure transitions to step S425.

In step S424, exposure control of the image sensor 108 is performed based on the luminance value calculated in one of steps S419, S421 and S422. The CPU 113 uses the mirror drive circuit 117 to drive the main mirror 102 out of the imaging light path, and uses the image sensor drive circuit 115 to drive the image sensor 108.

In step S425, the CPU 113 determines whether or not the switch SW1 has been turned on. If the switch SW1 has been turned on, the procedure returns to step S401, where an AF operation and a shooting operation are performed again. On the other hand, if the switch SW1 has not been turned on, the series of shooting operations ends.

Next, drive control of the AF sensor 109 performed in step S406 will be described in detail with reference to a flowchart in FIG. 5.

In step S501, the CPU 113 sets an internal parameter value Tstp to 200 ms. Here, a maximum accumulation period at which an accumulation operation in the AF sensor 109 is forcibly stopped is denoted by Tstp, and 200 ms is set as an initial value. In step S502, the CPU 113 instructs the AF sensor control circuit 116 to start accumulation in the pairs of line sensors 201 to 209 of the AF sensor 109. At the same time, the counter inside the CPU 113 is reset, and counting up is started.

In step S503, the CPU 113 determines whether or not there is a pair of line sensors in which accumulation has stopped among the pairs of line sensors 201 to 209 by communicating with the AF sensor control circuit 116. If there is a pair of line sensors in which accumulation has stopped, the procedure transitions to step S505. On the other hand, if there is no pair of line sensors in which accumulation has stopped, the procedure transitions to step S504, where the CPU 113 determines the accumulation period using the internal counter. If the accumulation period has reached 200 ms, the procedure transitions to step S514, and if the accumulation period has not reached 200 ms, the procedure returns to step S503.

In step S505, the CPU 113 stores an accumulation period T1 of a pair of line sensors in which accumulation has stopped first, from the internal counter.

Steps S506 to S509 are determination operations for resetting the maximum accumulation period Tstp, and the maximum accumulation period Tstp after which a forced stop is performed is changed based on these determinations.

In step S506, the CPU 113 determines, based on the internal control flag FL, whether or not the ambient light is a flicker light source. If FL is 1, the procedure transitions to the next determination operation, namely, step S507, and if FL is 0, the procedure transitions to step S510.

In step S507, the CPU 113 determines whether or not the ratio of the accumulation period T1 of the pair of line sensors in which accumulation has stopped to a flicker period TF is less than or equal to a threshold value TH1. If T1/TF is less than or equal to the threshold value TH1, the procedure transitions to the next determination operation, namely, step S508, and if T1/TF is greater than the threshold value TH1, the procedure transitions to step S510.

In step S508, the CPU 113 determines, based on the internal control flag ETTL, whether or not the shooting mode is the evaluation AE mode. If ETTL is 1, the procedure transitions to the next determination operation, namely, the step S509, and if ETTL is 0, the procedure transitions to step S510.

In step S509, the CPU 113 determines the internal control flag FACE indicating a face detection result. If FACE is 0, the procedure transitions to step S511. On the other hand, if FACE is 1, the procedure transitions to step S510.

In step S510, the maximum accumulation period Tstp is reset to a period T2. Here, T2 is assumed to be T1×2. On the other hand, in step S511, the maximum accumulation period Tstp is reset to a period T3 for a flicker light source. The period T3 is equal to T1×4 that is longer than T2 in step S510. By setting T3 longer than T2, the maximum accumulation period Tstp for a flicker light source will be longer than in a case where the ambient light is not a flicker light source.

Here, supplementary description regarding the above processing will be given. In step S507, if the accumulation period T1 is sufficiently longer than the flicker period TF, it can be determined that the pair of line sensors has not received direct light of a flicker light source, in other words, the possibility that a flicker light source is included in the AF frames is low. Therefore, even if flicker is occurring, it can be determined that fluctuation of T1 due to the accumulation timing is small since indirect light of the flicker light source is received, and thus in step S510, T2 which is shorter than T3 is set as the maximum accumulation period Tstp.

Figure 4B:
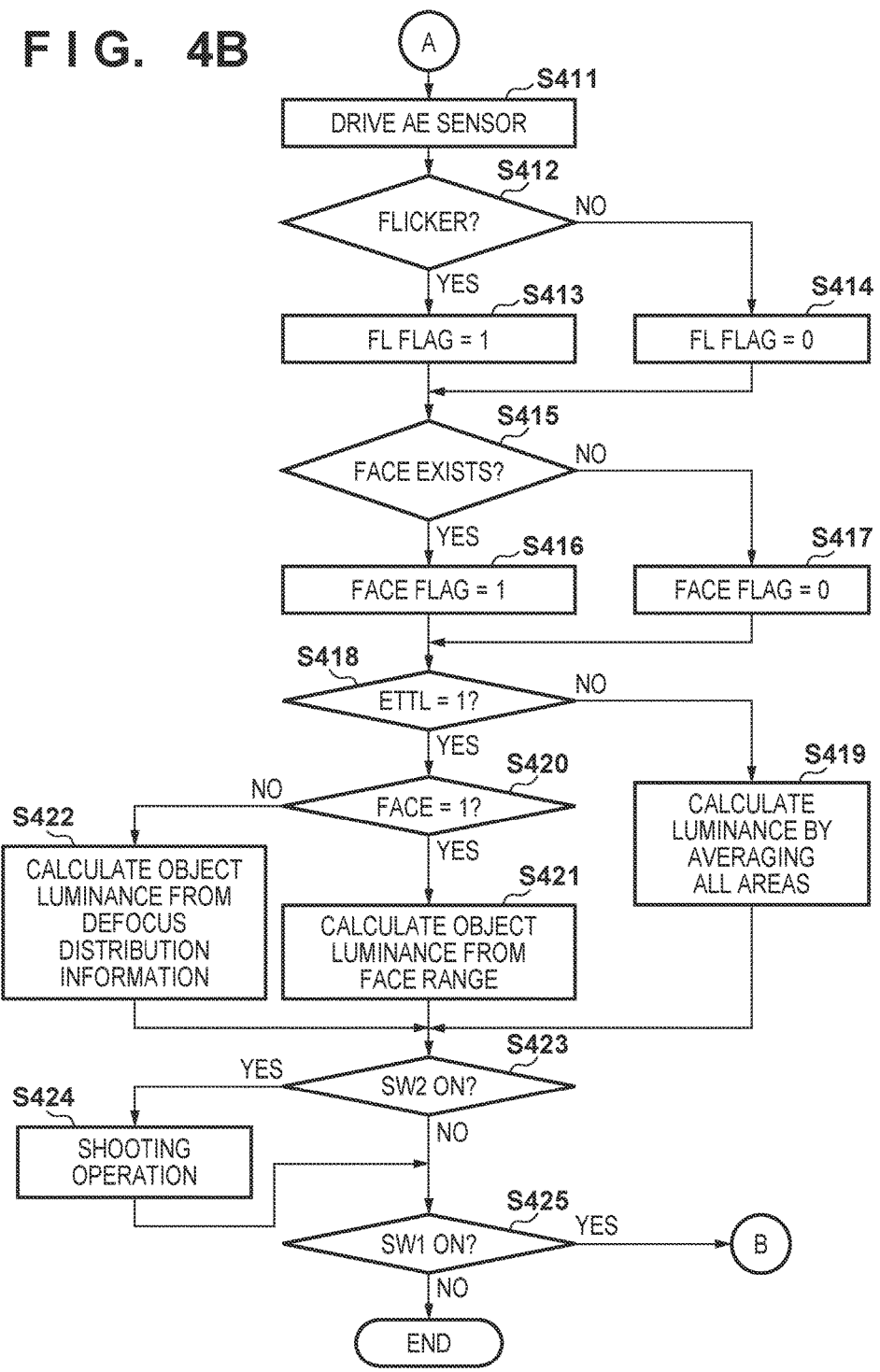
FIG. 4B is a flowchart showing the shooting operation according to the embodiment.

In step S508, if ETTL is 0 (the average AE mode), even if the AF frame includes a flicker light source, as described in step S419 in FIG. 4B, defocus distribution information is not used when performing luminance calculation. Therefore, in step S510, T2 which is shorter than T3 is set as the maximum accumulation period Tstp. Also, if it is determined in step S509 that FACE is 1 (there is a face), as described in step S421 in FIG. 4B, the luminance values of the areas included in the range of the face are used. Therefore, if a flicker light source is included in the AF frames, and the evaluation AE mode has been selected, defocus distribution information is not used when performing luminance calculation. Therefore, in step S510, T2 which is shorter than T3 is set as the maximum accumulation period Tstp. In other cases, T3 is set in step S511 such that more accurate defocus distribution information can be used when performing luminance calculation.

In step S512, the CPU 113 determines whether or not accumulation in all the pairs of line sensors 201 to 209 has stopped, by communicating with the AF sensor control circuit 116. If accumulation in all the pairs of line sensors 201 to 209 has stopped, the subroutine sequence of AF sensor drive control ends, and the procedure returns to the main sequence in FIG. 4A. On the other hand, if accumulation in any of the pairs of line sensors 201 to 209 has not stopped, the procedure transitions to step S513.

In step S513, the CPU 113 determines the accumulation period using the internal counter. If the accumulation period reached the maximum accumulation period Tstp that has been reset in step S510 or step S511, the procedure transitions to step S514. On the other hand, if the accumulation period has not reached the maximum accumulation period Tstp that has been reset, the procedure transitions to step S512.

In step S514, the CPU 113 outputs an accumulation stop request signal to the AF sensor control circuit 116 in order to forcibly stop accumulation, ends the subroutine sequence of AF sensor drive, and returns to the main sequence.

As described above, according to this embodiment, in the case where a flicker light source is detected and processing that uses defocus distribution information is to be performed, the maximum accumulation period Tstp is set longer than otherwise. This makes it possible to reduce the influence of the flicker light source, and calculate a defocus amount based on image signals obtained from more pairs of line sensors. Accordingly, if the number of AF frames whose defocus amount cannot be calculated is reduced, it becomes possible to obtain stable defocus information, and reduce AF control variation at the time of repetitive shooting.

Also in AE control, in the case of the average AE mode, or in the case where a face has been detected, AE control is performed without using defocus distribution information, and thus even if a flicker light source is detected, the maximum accumulation period Tstp can be set short.

Note that in this embodiment, flicker determination is performed in step S412 after the sensor driving operation in step S406. Therefore, in an AF sensor driving operation for the first time, even if a flicker light source is included in the AF frames, the internal control flag FL is 0, and thus the period T3 for a flicker light source cannot be set. In this case, the period T3 for a flicker light source can be set for the second time onward. In view of this, if an AE drive operation for flicker detection and face detection is performed before the sensor driving operation of step S406, the period T3 for a flicker light source can be set from the sensor driving operation performed for the first time.

In addition, in the above-described example, a case has been described in which the position and range of an object are obtained and luminance calculation is performed, as an example of using defocus distribution information, but the present invention is not limited thereto, and the present invention can be applied in the case of performing processing using defocus distribution information.

Moreover, the above processing of steps S508 and S509 does not necessarily need to be performed, and control may be performed according to whether or not a flicker light source is included in AF frames.

Variation

Figure 5:
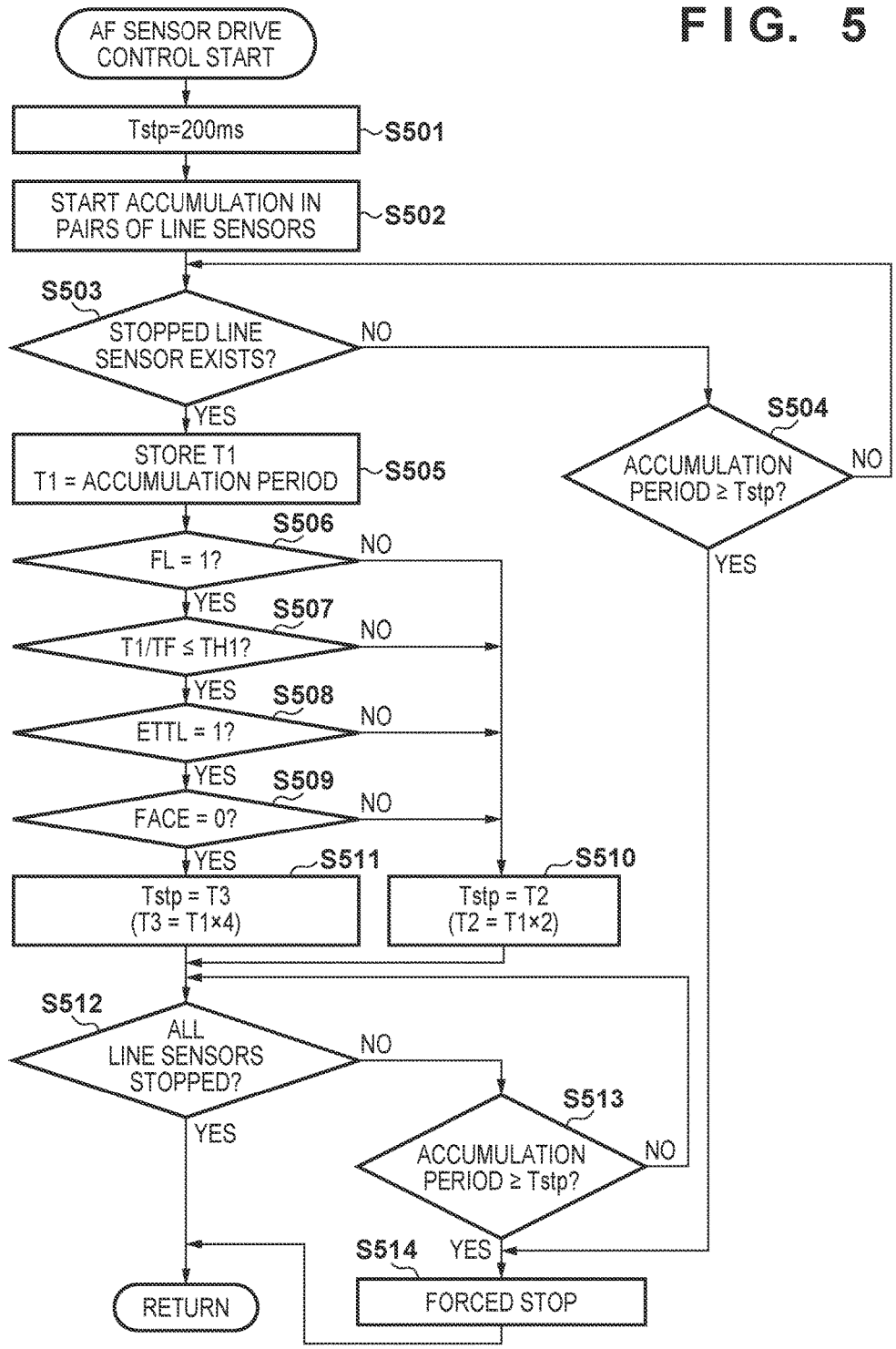
FIG. 5 is a flowchart of a subroutine showing an AF operation according to the embodiment.

As a variation, in steps S510 and S511 in FIG. 5, the maximum accumulation period Tstp is reset based on the accumulation period T1 at which stop determination is performed for the first time. The maximum accumulation period Tstp for a flicker light source is set to T1×4, but a configuration may be adopted in which this ×4 is replaced by a coefficient K, and the coefficient K is set according to the shooting mode.

For example, in a case of a camera in which a high speed mode in which the number of shots per second is greater than or equal to a predetermined number of shots and a low speed mode in which the number of shots per second is smaller than the predetermined number of shots can be set, the coefficient K is set larger in the low speed mode, compared with the high speed mode. This is because the shooting interval is long in the low speed mode, and thus a longer accumulation period does not influence the shooting.

Moreover, in the case of a camera in which the number of AF frames or the range of an AF frame can be selected as another shooting mode, if the number of selected AF frames is greater than or equal to a predetermined number of frames, the coefficient K is set large. This is because more precise detection of the object position and the object range is required the larger the range in which focus detection is performed. Accordingly, a defocus amount can be calculated using image signals obtained from a greater number of pairs of line sensors by setting the accumulation period longer.

The present invention is not limited to the embodiment, and various modifications and changes can be made without departing from the scope of the invention.

For example, the image capturing apparatus may be any electronic devices having a camera function such as a mobile phone having a camera function and a computer equipped with a camera, in addition to cameras such as digital still cameras and digital video cameras.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-120205, filed on Jun. 16, 2016, which is hereby incorporated by reference herein in its entirety.

What is claimed is:

1. A focus detection apparatus comprising:
a determination unit configured to determine whether or not a flicker light source is included in a plurality of predetermined focus detection areas;
a plurality of sensors for focus detection that correspond to the focus detection areas, and in which electric charges corresponding to received light accumulate; and
a controller configured to control accumulation in the sensors,
wherein the controller monitors a signal that is based on electric charges accumulated in each of the sensors, performs first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period, and sets the maximum accumulation period of a sensor that is different from a first sensor in which accumulation has been stopped first by the first control, based on a result of determination performed by the determination unit and the accumulation period of the first sensor.

2. The focus detection apparatus according to claim 1, wherein if the accumulation period of the first sensor is the same for a case where a flicker light source is included in the focus detection areas and a case where a flicker light source is not included the focus detection areas, the maximum accumulation period in the case where the flicker light source is included is set longer than the maximum accumulation period in the case where the flicker light source is not included.

3. The focus detection apparatus according to claim 1 further comprising:
a detection unit configured to obtain a plurality of focus states respectively corresponding to the focus detection areas, based on signals read out from the sensors; and
a processor configured to perform predetermined processing that uses the focus states,
wherein if the accumulation period of the first sensor is the same for a case where a flicker light source is included in the focus detection areas and a case where a flicker light source is not included in the focus detection areas, the maximum accumulation period in the case where the flicker light source is included and the predetermined processing is to be performed is set longer than the maximum accumulation period in other cases.

4. The focus detection apparatus according to claim 3, wherein the predetermined processing is processing for detecting a position and an area of an object in an imaging screen.

5. The focus detection apparatus according to claim 1, wherein the controller sets the maximum accumulation period of the sensor that is different from the first sensor by multiplying the accumulation period of the first sensor by a coefficient, and in a case where the determination unit determines that the flicker light source is included, uses a first coefficient, and in a case where the determination unit determines that the flicker light source is not included, uses a second coefficient that is smaller than the first coefficient.

6. The focus detection apparatus according to claim 5, wherein in a case where the number of shots per second is smaller than a predetermined number of shots, the first coefficient is set higher than in a case where the number of shots per second is greater than or equal to the predetermined number of shots.

7. The focus detection apparatus according to claim 5, wherein in a case where the number of the focus detection areas is greater than or equal to a predetermined number, the first coefficient is set higher than in a case where the number of the focus detection areas is smaller than the predetermined number.

8. The focus detection apparatus according to claim 1 further comprising:
a detection unit configured to obtain a plurality of focus states respectively corresponding to the focus detection areas, based on signals read out from the sensors; and
a processor configured to perform predetermined processing that uses the focus states,
wherein the controller sets the maximum accumulation period of a sensor different from the first sensor by multiplying the accumulation period of the first sensor by a coefficient, and in a case where the determination unit determines that the flicker light source is included and the predetermined processing is to be performed, the controller uses a first coefficient, and otherwise uses a second coefficient that is smaller than the first coefficient.

9. The focus detection apparatus according to claim 8, wherein the determination unit determines whether or not there is a flicker light source, and a flicker period in a case where there is a flicker light source, based on a luminance value obtained from a photometry area corresponding to the focus detection areas, and in a case where a ratio of the accumulation period of the first sensor to the flicker period is less than or equal to a predetermined threshold value, the controller uses the first coefficient.

10. The focus detection apparatus according to claim 8, wherein the predetermined processing is processing for detecting a position and an area of an object in an imaging screen.

11. The focus detection apparatus according to claim 8, wherein in a case where the number of shots per second is less than a predetermined number of shots, the first coefficient is set higher than in a case where the number of shots per second is greater than or equal to the predetermined number of shots.

12. The focus detection apparatus according to claim 8, wherein in a case where the number of the focus detection areas is greater than or equal to a predetermined number, the first coefficient is set higher than in a case where the number of the focus detection areas is smaller than the predetermined number.

13. A focus detection apparatus comprising:
a plurality of sensors for focus detection that correspond to a plurality of predetermined focus detection areas, and in which electric charges corresponding to received light accumulate; and
a controller configured to control accumulation in the sensors,
wherein the controller monitors a signal that is based on electric charges accumulated in each of the sensors, performs first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period, and sets the maximum accumulation period of a sensor that is different from a first sensor in which accumulation has been stopped first by the first control, based on an accumulation period of the first sensor, and
the maximum accumulation period of the sensor that is different from the first sensor is changed according to whether or not a predetermined condition, including a condition that a flicker light source is included in the focus detection areas, is satisfied.

14. The focus detection apparatus according to claim 13, wherein the controller sets the maximum accumulation period of the sensor that is different from the first sensor by multiplying the accumulation period of the first sensor by a coefficient, and in a case where the predetermined condition is satisfied, uses a first coefficient, and in a case where the predetermined condition is not satisfied, uses a second coefficient that is smaller than the first coefficient.

15. The focus detection apparatus according to claim 13, wherein the predetermined condition includes a condition that a ratio of the accumulation period of the first sensor to a flicker period of the flicker light source is less than or equal to a predetermined threshold value.

16. The focus detection apparatus according to claim 13, wherein the predetermined condition includes a condition that a mode for performing processing that uses distribution information of a plurality of focus states respectively corresponding to the plurality of focus detection areas is set.

17. The focus detection apparatus according to claim 13, wherein the predetermined condition includes a condition that a face has not been detected in an imaging screen.

18. An image capturing apparatus comprising:
an image capturing unit; and
a focus detection apparatus comprising:
a determination unit configured to determine whether or not a flicker light source is included in a plurality of predetermined focus detection areas;
a plurality of sensors for focus detection that correspond to the focus detection areas, and in which electric charges corresponding to received light accumulate; and
a controller configured to control accumulation in the sensors,
wherein the controller monitors a signal that is based on electric charges accumulated in each of the sensors, performs first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period, and sets the maximum accumulation period of a sensor that is different from a first sensor in which accumulation has been stopped first by the first control, based on a result of determination performed by the determination unit and the accumulation period of the first sensor.

19. An image capturing apparatus comprising:
an image capturing unit; and
a focus detection apparatus comprising:
a plurality of sensors for focus detection that correspond to a plurality of predetermined focus detection areas, and in which electric charges corresponding to received light accumulate; and
a controller configured to control accumulation in the sensors,
wherein the controller monitors a signal that is based on electric charges accumulated in each of the sensors, performs first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period, and sets the maximum accumulation period of a sensor that is different from a first sensor in which accumulation has been stopped first by the first control, based on an accumulation period of the first sensor, and
the maximum accumulation period of the sensor that is different from the first sensor is changed according to whether or not a predetermined condition, including a condition that a flicker light source is included in the focus detection areas, is satisfied.

20. A control method of a focus detection apparatus having a plurality of sensors for focus detection that correspond to a plurality of predetermined focus detection areas, and in which electric charges corresponding to received light accumulate and a controller configured to control accumulation in the sensors, the control method comprising:

determining whether or not a flicker light source is included in the focus detection areas;

monitoring a signal that is based on electric charges accumulated in each of the sensors, and performing first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period; and setting the maximum accumulation period of a sensor that is different from a first sensor in which accumulation has been stopped first by the first control, based on a result of determination in the determining and the accumulation period of the first sensor.

21. A control method of a focus detection apparatus having a plurality of sensors for focus detection that correspond to a plurality of predetermined focus detection areas, and in which electric charges corresponding to received light accumulate and a controller configured to control accumulation in the sensors, the control method comprising:

monitoring a signal that is based on electric charges accumulated in each of the sensors, and performing first control for stopping accumulation in a sensor in which the signal has exceeded a predetermined threshold value among the sensors, and second control for stopping accumulation in a sensor in which accumulation of electric charges has not been stopped in a case where an accumulation period of electric charges has reached a predetermined maximum accumulation period; and setting the maximum accumulation period of a sensor that is different from a first sensor in which accumulation has been stopped first by the first control, based on an accumulation period of the first sensor, wherein, in the setting of the maximum accumulation period, the maximum accumulation period of the sensor that is different from the first sensor is changed according to whether or not a predetermined condition including a condition that a flicker light source is included in the focus detection areas is satisfied.

* * * * *